United States Patent

Van Gerwen

[15] 3,646,447

[45] Feb. 29, 1972

[54] RECEIVER FOR RECEPTION OF MODULATED PULSES LYING IN A GIVEN SIGNAL BAND

[72] Inventor: Petrus Josephus Van Gerwen, Emmasingel, Eindhoven, Netherlands

[73] Assignee: U.S. Philips Corporation, New York, N.Y.

[22] Filed: Oct. 21, 1970

[21] Appl. No.: 82,636

[30] Foreign Application Priority Data

Nov. 4, 1969 Netherlands..........................6916580

[52] U.S. Cl. ..............................325/321, 325/38 R, 325/63, 325/420, 329/122

[51] Int. Cl.........................................H04b 1/18, H03k 9/00

[58] Field of Search....................325/41, 42, 65, 63, 49, 321, 325/38 R, 323, 324, 329, 419, 420, 423; 329/122, 123

[56] References Cited

UNITED STATES PATENTS 3,391,339 7/1968 Lynch....................................325/49

*Primary Examiner*—Robert L. Griffin
*Assistant Examiner*—Kenneth W. Weinstein
*Attorney*—Frank R. Trifari

[57] ABSTRACT

Receiver for the reception of pulses modulated on a carrier wave, comprising a device forming frequencies $F_1+f_2$ and $f_1-f_2$ from two transmitted pilot frequencies $f_1$ and $f_2$ from which the local carrier and clock signals respectively are derived. In order to reduce the phase shifts of these signals due to frequency shifts on the transmission path, the device comprises two automatic phase correction (AFC)-loops each including a phase discriminator and an oscillator, the incoming signals being applied to the phase discriminator of the first AFC-loop and the associated oscillator being tuned to $f_1$ or $f_2$, while the output voltage of said phase discriminator is applied both to the phase discriminator of the second AFC-loop whose oscillator is tuned to $f_1+f_2$ and to a selective circuit tuned to $f_1-f_2$.

1 Claims, 3 Drawing Figures

INVENTOR.
PETRUS J. VAN GERWEN
BY
AGENT

INVENTOR.

PETRUS J. VAN GERWEN

BY

AGENT

RECEIVER FOR RECEPTION OF MODULATED PULSES LYING IN A GIVEN SIGNAL BAND

The invention relates to a receiver for the reception of modulated pulses lying in a given signal band, the instants of appearance of which are determined by a fixed clock frequency, while on either side of the signal band pilot frequencies $f_1$ and $f_2$ are provided, said receiver comprising a device which forms the sum frequency $f_1+f_2$ and the difference frequency $f_1-f_2$ from said pilot frequencies, from which frequencies are derived the local carrier frequency and the local clock frequency respectively, The mode of modulation of the incoming pulses may be: phase modulation, orthogonal modulation, single sideband modulation and the like.

In order to obtain optimum receiving conditions, it is required from receivers of the kind set forth that the locally restored carrier wave and clock signals should correspond not only in frequency but also in phase within a tolerance of a few degrees with the incoming carrier wave signal and the clock signal at the transmitter end respectively. The phase synchronization poses a very severe requirement on the construction of these receivers. More particularly, in known embodiments of these receivers the two pilot frequencies $f_1$ and $f_2$ are selected in said device for the local restoration of the carrier and clock signals with the aid of pilot filters. Subsequent to mixing of $f_1$ and $f_2$ in a mixing stage, the frequencies $f+f_2$ and $f_1-f_2$ are obtained by means of selective filters, from which frequencies the local carrier and clock signals respectively are derived, for example, after frequency division, if desired.

It is found that difficulties arise with such systems, if frequency shifts occur on the transmission path, for example, due to a carrier-frequency telephone system included between the transmitter and the receiver, in which the carrier-frequency oscillators at the transmitter end and at the receiver end are not completely synchronized, but may exhibit, as usual, a frequency difference of a few Hz. Owing to the aforesaid selective filters these frequency shifts introduce undesirable phase shifts of the signals from which the local carrier and clock signals are derived. In order to compensate for these frequency-dependent phase shifts additional steps have to be taken, so that such receivers are particularly complicated.

The invention has for its object to provide a different conception of the aforesaid device, in which in a particularly simple manner, under all conditions, the phase shifts are caused by the frequency shifts of local carrier and clock signals are reduced.

The device according to the invention is characterized in that it comprises two automatic phase-correction (AFC)-loops each including an oscillator and a mixing stage operating as a phase discriminator, the oscillator signal and a control-signal being applied to the mixing stage, the output of which provides a signal which is applied via a control-lead to a low band pass filter, from the output of which is derived a control-voltage which controls a frequency-determining element of the oscillator, in which device the oscillator of the first AFC-loop is tuned to one of the piolet frequencies $f_1, f_2$, while the incoming signals are applied to the mixing stage of the first AFC-loop, the output of the mixing stage of the first AFC-loop having connected to it not only the control-lead but also two parallel leads, the first of which passes to the mixing stage of the second AFC-loop, the oscillator of which is tuned to the frequency $f_1+f_2$, whereas the second lead passes to a selective circuit tuned to the frequency $f_1+f_2$, the sum frequency $f_1-f_2$ and the difference frequency $f_1-f_2$ being derived from the oscillator of the second AFC-loop and the selective circuit respectively.

The invention and its advantages will now be described more fully with reference to the Figures.

Figure 1:
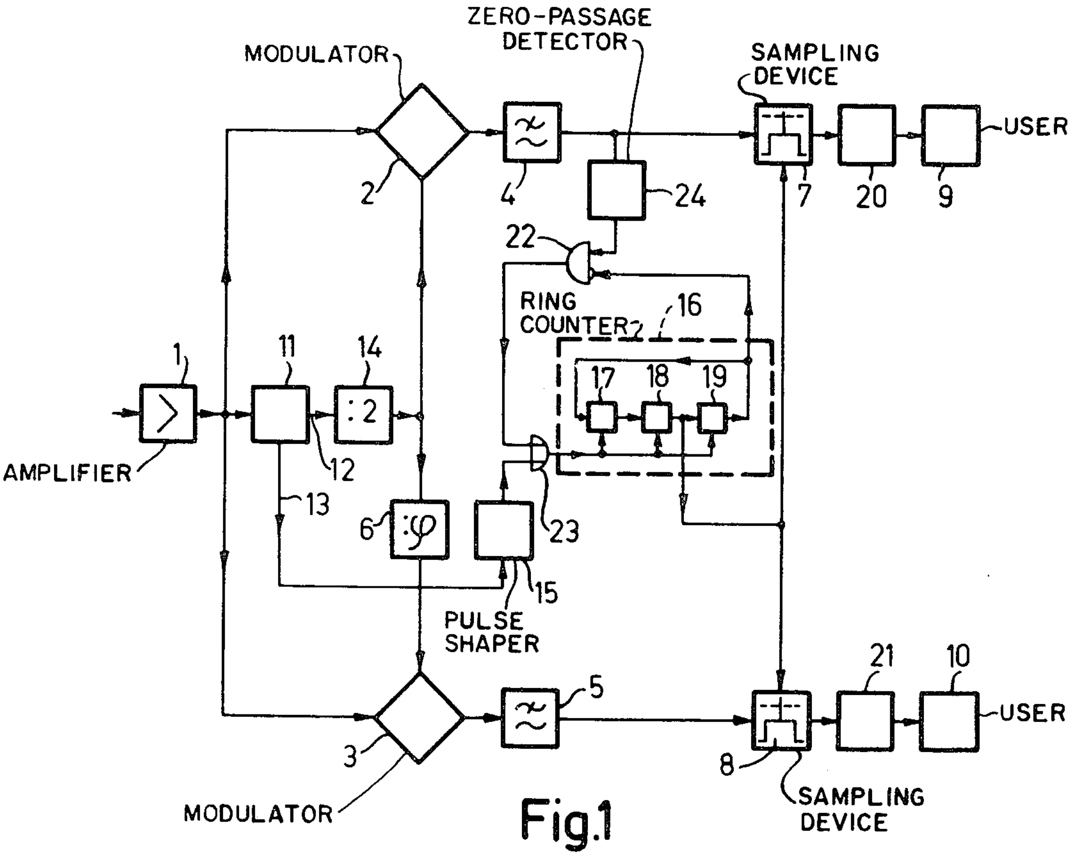
FIG. 1 shows a receiver for the reception of orthogonally modulated signals.

FIG. 1 shows a receiver for the reception of pulses modulated on a carrier wave and lying within a signal band of, for example, 1,500 Hz. the instants of appearance of which are determined by a fixed clock frequency of, for example, 1,200 Hz. The receiver shown is adapted to receiver simultaneously two pulses sequences each modulated on a separate carrier wave, said carrier waves having the same frequency of, for example, 1,800 Hz. but having a phase difference of 90°. This mode of modulation is known by the term of orthogonal modulation.

Figure 2:
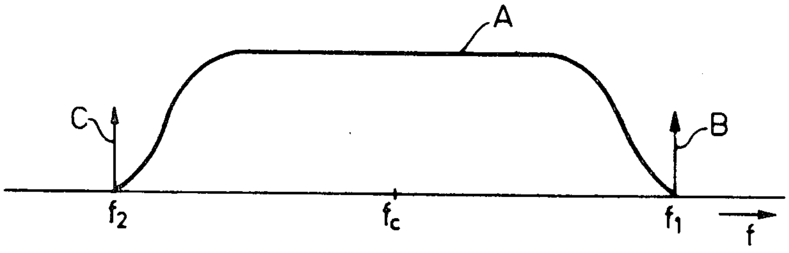
FIG. 2 illustrates a frequency diagram of the incoming signals.

For the local restoration of carrier and clock signals pilot frequencies $f_1$, for example, 2,700 Hz. and $f_2$, for example 900 Hz., are transmitted simultaneously one on each side of the signal band. The carrier frequency in this embodiment is $(f_1+f_2)/2$ and the clock frequency is $2(f_1-f_2)/3$. FIG. 2 illustrates the frequency diagram of the incoming signals, in which A designates the signal band, B and C the pilot frequencies $f_1$ and $f_2$ respectively.

In the receiver shown the incoming orthogonally modulated pulse sequences are applied via and amplifier 1 to an orthogonal demodulation device comprising two push-pull modulators 2, 3 and two output filters 4, 5. To the push-pull modulators 2, 3 is applied a locally produced carrier signal, one of the carrier supply leads including a 90° phase-shifting network 6. The output filters 4, 5 are connected to two sampling devices 7 and 8 respectively, to which also a locally produced clock signal is applied. The outputs of the sampling devices are applied to two users 9 and 10 respectively.

In order to restore the carrier and clock signals the output of the receiver amplifier 1 also connected to a device 11 to be described hereinafter, from the outputs 12 and 13 of which a signal having a frequency $f_1+f_2$ and a frequency $f_1-f_2$ respectively is derived. The output 12 is connected to the input of a divide-by-two circuit 14, the output of which provides the local carrier signal of the frequency $(f_1+f_2)/2$, whereas the output 13 is connected via a pulse shaper 15 to the clock pulse input of a ring counter 16, which is formed by a feedback shift-register formed by a plurality of cascade-connected shift-register elements 17, 18, 19, the output of the shift register being connected to its input and the contents of the shift-register elements 17, 18, 19 being passed on by the pulses from the pulse shaper 15; the ring counter 16 is furthermore provided with a monitoring device (not shown), which ensures that invariably one of the outputs of the shift-register elements 17, 18, 19 assumes the logical value "1." The local clock signal of the frequency $2(f_1-f_2)/3$ is derived from the output of the shift-register element 18. The carrier and clock signals thus restored fro the pilot signals $f_1$ and $f_2$, are applied to the push-pull modulators 2, 3 and to the sampling devices 7, 8 respectively.

In order to ensure a satisfactory operation of the receiver it has to be taken into account in its design , the frequency division with the aid of the divide-by-two circuit 14 and ring counter 16 gives rise to ambiguity of the phase of the local carrier and clock signals respectively. The carrier signal derived from the divide-by-two circuit 14 may be cophase to the incoming carrier signal, but it may as well be 180° out of phase. Likewise the instants of appearance of the pulses in the local clock signal may coincide with the sampling instants, but they may be shifted relatively thereto by a time of one-third$_{clock}$or two-third$f_{clock}$, wherein $f_{clock} = 2(f_1 - f_2)/3$. In order to eliminate the phase ambiguity of the local carrier signal, a code converter formed by a change-of-state modulator is used in the transmitter, whereas in the receiver the inversion is carried out by means of a change-of-state decoder 20, 21 connected to the output of the sampling device 7 and 8 respectively. In order to eliminate the phase ambiguity of the clock signal the output of the ring counter 16 is applied, in addition, via an inhibitor gate 22 and an OR-gate 23 to the clock pulse input thereof. The input of the OR-gate 23 is also connected to the output of the pulse-shaper 15, whereas the input of the inhibitor gate 22 is also connected to the output of a zero passage detector 24, connected to the output filter 4, which detector provides a pulse to the inhibitor gate 22 at each zero passage of the demodulated information signal. If the instants of appearance of the local clock pulses coincide with the sampling instants, the pulses supplied by the zero-passage detector 24 coincide with the pulses appearing at the output of the ring counter 16. Thus only the pulses from the pulse-shaper 15 are applied via the OR-gate 23 to the clock pulse input of the ring counter 16. If said instants do not coincide, no pulse will appear at the output of the ring counter 16 at the instants when the zero-passage detector 24 provides a pulse. As a result, additional pulses are applied via the OR-gate 23 to the clock pulse input of the ring counter 16 so that the desired phase correction of the local clock signal is ensured.

In this way, while phase ambiguity is avoided, the carrier and clock signals are restored in the receiver from the pilot frequencies $f_1$ and $f_2$, the frequencies of said signals corresponding accurately with the frequencies of the incoming carrier wave and of the clock signal at the transmitter end respectively. If on the transmission path a frequency shift $\Delta f$ occurs, the clock frequency is not affected, since it is not sensitive to frequency shifts on the transmission path, but the carrier frequency and the pilot frequencies will then exhibit a frequency shift $\Delta f$. The clock frequency derived from the ring counter 16 and regained from the pilot frequencies $f_1 + \Delta f$ and $f_2 + \Delta f$ is $2(f_1 - f_2)/3$ and is independent of the frequency shift, whereas the restored carrier frequency derived from the divide-by-two circuit 14 is $[(f_1 + f_2)/2] + \Delta f$ and has been subjected to a frequency shift $\Delta f$ so that the local carrier frequency is equal to the frequency of the incoming carrier signal. The phases of the local carrier and clock signals are subjected, however, to a phase shift depending upon the value of the frequency shift $\Delta f$, which phase shift may attain high values due to the high selectivity of the selective circuits used in the device 11. This phase shift may be 70° with a frequency shift $\Delta f$ of 10 c.p.s. Thus the pulse discriminating power of the receiver is considerably reduced and the sensitivity to interference is particularly increased.

In order to drastically reduce the phase shifts of the local carrier and clock signals due to the frequency shifts on the transmission path, the device 11 is provided, in accordance with the invention, with two automatic phase correction (AFC)-loops 25 and 26, each comprising an oscillator 27 and 28 respectively and a mixing stage 29 and 30 respectively, in which the oscillator signal and a control-signal are applied to the mixture stages 29 and 30 respectively, the outputs of which provide a signal applied via a control-lead 31 and 32 respectively to a low-pass filter 33 and 34 respectively, a control-voltage being derived from the outputs thereof for controlling a frequency-determining element 35, 36 respectively of the oscillators 27 and 28 respectively. In this device the oscillator 27 of the AFC-loop 25 is tuned to the pilot frequency $f_1$ and the incoming signals are applied to the mixing stage 29 of the AFC-loop 25, while the output of the mixing stage 29 of the AFC-loop 25 has connected to it not only the control-lead 31 but also two parallel leads 37 and 38, the lead 37 being connected to the mixing stage 30 of the AFC-loop 26, whose oscillator 28 is tuned to the frequency $f_1 + f_2$, whereas the lead 38 is connected to a selective circuit formed by a selective filter 39, tuned to the frequency $f_1 - f_2$, the sum frequency $f_1 + f_2$ and the difference frequency $f_1 - f_2$ being derived from the oscillator 28 of the AFC-loop 26 and from the selective filter 39 respectively.

Figure 3:
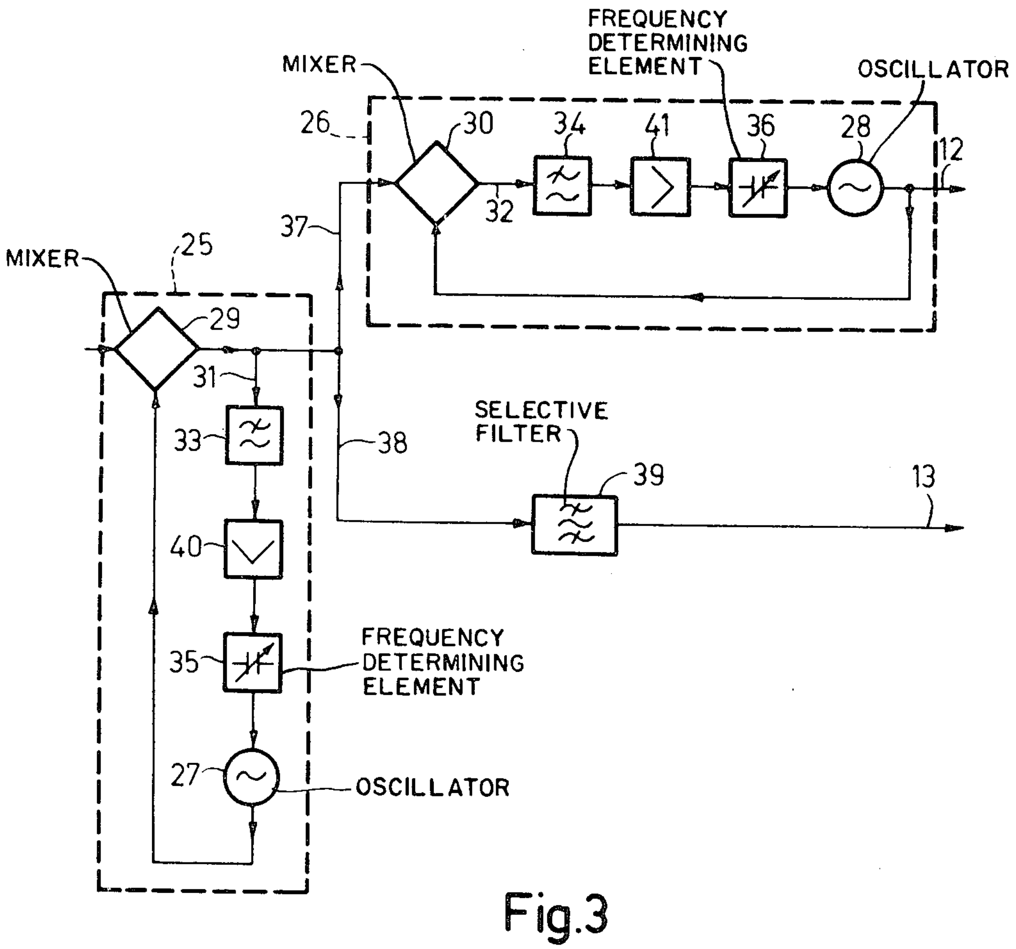
FIG. 3 shows a device embodying the invention.

In the device 11 shown in FIG. 3, the incoming signals as illustrated in the frequency diagram of FIG. 2 are applied to the mixing stage 29, operating as a phase discriminator. By mixing the signal from the oscillator 27 tuned to the frequency $f_1$ with the pilot signal of the frequency $f_1$, serving as a control-signal for the oscillator 27, the output of the mixing stage 29 provides a control signal which, subsequent to the suppression of the undesirable frequency components by means of the low band-pass filter 33, is applied for synchronizing purposes to a frequency-determining element 35 of the oscillator 27. If the initial frequency of the oscillator 27 is unequal to the pilot frequency $f_1$ a DC-control voltage will appear in the manner described above at the output of the low-pass filter 33, which voltage accurately synchronizes the oscillator 27 to the frequency $f_1$. The low-pass filter 33 may comprise a series resistor and a shunt capacitor having a limit frequency of, for example, 0.1 Hz.

In the device 11 shown, the output of the mixing stage 29 is connected not only via the control-lead 31 to the low-pass filter 33 but also via the two parallel leads 37 and 38 to the AFC-loop 26 and to the selective filter 39 respectively, since at the output of the mixing stage 29 there appears not only the DC-control voltage for synchronizing the oscillator 27, but also other mixing products. More particularly, by mixing the oscillator frequency $f_1$ with the pilot frequency of $f_2$ the frequencies $f_1 - f_2$ and $f_1 + f_2$ appear at the output of the mixing stage 29. With the aid of the selective filter 39 in the lead 38 the frequency $f_1 - f_2$ is selected from the output signal of the mixing stage 29, whereas the signal of the frequency $f_1 + f_2$ in the output signal of the mixing stage 29 forms the control-signal of the AFC-loop 26, whose oscillator 28 is synchronized to the frequency $f_1 + f_2$ in the manner described for the AFC-loop 25. With the aid of the ring counter 16 connected to the selective filter 39 and of the divide-by-two circuit 14 connected to the oscillator 28 the clock signal of the frequency $2(f_1 - f_2)/3$ and the carrier signal of the frequency $(f_1 + f_2)/2$ are restored from the selected frequencies.

As in the known device frequency shifts on the transmission path are followed by the restored carrier frequency and the restored clock frequency remains independent of said frequency shifts. If, for example, a frequency shift $\Delta f$ occurs on the transmission path, so that the pilot frequencies become $f_1 + \Delta f$ and $f_2 + \Delta f$, the oscillator 27 is synchronized to the frequency $f_1 + \Delta f$ and the frequencies $f_1 - f_2$ and $f_1 + f_2 + 2\Delta f$ will appear at the output of the mixing stage 29. The frequency $f_1 - f_2$ is selected by the selective filter 39, whereas the frequency $f_1 + f_2 + 2\Delta f$ is used for synchronizing the oscillator 28. Like in the known device the frequency of the clock signal derived from the ring counter 16 becomes $2(f_1 - f_2)/3$ and the frequency of the carrier signal derived from the divide-by-two circuit 14 becomes $[(f_1 + f_2)/2] + \Delta f$, but the device according to the invention is different in that the phase shift dependent upon the frequency shift $\Delta f$ is materially reduced, as will be described more fully hereinafter.

It will be assumed that the frequency of the oscillator 27 is practically equal to the pilot frequency $f_1$ and that the frequency of the oscillator 28 is substantially equal to the frequency $f_1 + f_2$. In this case a minimum control-voltage of negligible value will appear for the synchronization of the oscillator 27 with the frequency $f_1$. This means pilot signal $f_1$ and the oscillator signal will have a relative phase difference of substantially $\pi/2$ because only under these conditions no control-voltage will appear at the output of the mixing stage 29. If the pilot signal $f_1$ is represented by $A \sin 2\pi f_1 t$ and the signal of the oscillator 27 by $B \sin (2\pi f_1 t + \pi/2)$ mixing of these signals in the mixing stage 29 provides the product $C \sin 2\pi\pi f_1 t \cdot \sin (2\pi f_1 t + \pi/2)$, which does not contain a direct current component. A phase difference of substantially $\pi/2$ will also occur between the signal of the frequency $f_1 + f_2$ at the output of the mixing stage 29 and the signal from the oscillator 28.

If a frequency shift $\Delta f$ occurs on the transmission path, the pilot frequencies become $f_1 + \Delta f$ and $f_2 + \Delta f$ and in order to obtain a control-voltage of the value R required for the synchronization of the oscillator 27 with the frequency $f_1 + \Delta f$ the signal from the oscillator 27 has to be subjected not only to the fixed phase shift of $\pi/2$ but also to an additional phase shift $\phi$ relative to the phase of the pilot signal $f_1 + \Delta f$. At the output of the mixing stage 29 there appears a direct voltage which is applied through a direct-voltage amplifier 40 as a control-voltage to the frequency-determining element 35 of the oscillator 27. If, for example, the pilot signal $f_1 + \Delta f$ is represented by $A \sin 2\pi (f_1 + \Delta f)t$ and the signal from the oscillator 27 by $B \sin [2\pi(f_1 + \Delta f)t + \pi/2 + \phi]$, the mixing product $C \sin 2\pi t(f_1 + \Delta f)t \cdot \sin [2\pi (f_1 + \Delta f)t + \pi/2 + \phi]$ at the output of the mixing stage 29 contains a direct voltage component of the value C sin $\phi$, which subsequent to amplification in the direct-voltage amplifier 40 having an amplification factor V, supplies the control-voltage of the value R. Expressed in a formula the relationship is therefore:

$$VC \sin \phi = R.$$

If in known manner the sensitivity $k$ of the oscillator, defined as:

$$k = 2\pi \Delta f / R$$

is introduced, the phase shift $\phi$ is found from the relationship:

$$\sin \phi = 2\pi \Delta f / kVC.$$

It appears therefrom that the phase shift $\phi$ can be rendered sufficiently small by an adequate value of the amplification factor $V$. In a practical embodiment in which $kV$ = 3,000 Rad/$V$.$sec$, the phase shift was 1° at a frequency shift of 10 Hz. The operation of the AFC-loop 26 is identical to that of the AFC-loop 25 described above so that also the AFC-loop 26 minimizes the phase shift in the signal from the oscillator 28 due to a frequency shift on the transmission path.

At the occurrence of frequency shifts on the transmission path inter alia the signals of the frequency $f_1 + f_2 + 2\,\Delta f$ and of the frequency $f_1 - f_2$ are obtained in this way with a phase shift of only a few degrees by mixing in the mixing stage 29 the incoming signals and the signal from the oscillator 27, said resultant signals being applied fro restoring the carrier and clock signals, on the one hand via the lead 37 to the AFC-loop 26 and on the other hand via the lead 38 to the selective filter 39. From the oscillator 28 is derived the signal of the frequency $f_1 + f_2 + 2\,\Delta f$, which also has a phase shift of only a few degrees. The signal of the frequency $f_1 - f_2$ is derived from the selective filter 39 and has not been subjected to a frequency-dependent phase shift, since the frequency $f_1 - f_2$ is independent of the frequency shifts occurring on the transmission path.

It is thus achieved that the phase shifts produced by frequency shifts on the transmission path in the restored carrier and clock signals derived from the divide-by-two circuit 14 and the ring counter 16 respectively are reduced to a few degrees so that under any condition the receiver provides by a simple arrangement an optimum reception. The receiver according to the invention is particularly characterized by an optimum pulse-discriminating power and a maximum insensitivity to interference.

For the sake of completeness it should be noted that the oscillator 27 may be tuned to the frequency $f_2$ instead of the frequency $f_1$, while a different ratio between the clock frequency and the frequency $f_1 - f_2$ may be used. In the embodiment shown the selective filter 39 may also be replaced by an AFC-loop.

What is claimed is:

1. A receiver for the reception of pulses modulated on a carrier wave and lying in a given signal band, the instants of appearance of said pulses being determined by a fixed clock frequency, pilot frequencies $f_1$ and $f_2$ lying one on each side of the signal band, the receiver comprising:
   - a device for forming the sum frequency $f_1 + f_2$ and the difference frequency $f_1 - f_2$ of the pilot frequencies, from which the local carrier frequency and the local clock frequency, respectively, of the receiver, are derived, where the device comprises:
     - two automatic phase correction (AFC)-loops, where each loop comprises:
       - an oscillator comprising a frequency determining element, and a mixing stage, together operating as a phase discriminator, the oscillator output signal and an input signal being applied to the mixing stage;
   - and a low-pass filter which receives the output of the mixing stage, from the output of which is derived a control-voltage which controls said frequency determining element of the oscillator,
   - in which device the oscillator of the first AFC-loop is tuned to one of the pilot frequencies, $f_1$, $f_2$; and in which incoming signals comprising said pulse modulated carrier wave are received at the input to the mixing stage of the first AFC-loop; and in which the output of the mixing stage of the first AFC-loop is connected to the input of the mixing stage of the second AFC-loop, the oscillator of which is tuned to the frequency $f_1 + f_2$, and is connected to a selective circuit tuned to the frequency $f_1 - f_2$; and in which the sum frequency $f_1 + f_2$ and the difference frequency $f_1 - f_2$ are derived from the oscillator of said second AFC-loop and from said selective circuit, respectively.

* * * * *

PO-1050
(5/69)

UNITED STATES PATENT OFFICE
CERTIFICATE OF CORRECTION

Patent No. 3,646,447 Dated February 29, 1972

Inventor(s) PETRUS JOSEPHUS VAN GERWEN

It is certified that error appears in the above-identified patent and that said Letters Patent are hereby corrected as shown below:

In the Abstract, line 2, change "$F_1 + f_2$" to --$f_1 + f_2$--.

Column 1, line 12, change the comma to a period;

line 65, change "$f_1 + f_2$" (first occurrence) to --$f_1 - f_2$--;

change "$f_1 - f_2$" (second occurrence) to --$f_1 + f_2$--.

Column 2, line 32, after "1" insert --is--;

line 49, change "fro" to --from--;

line 58, change "cophase" to --co-phase-- line 62, after "one-third" insert --f--.

Column 4, line 57, change "C sin 2 $f_1t$" to --C sin $2\pi f_1t$--.

Column 5, line 26, change "fro" to --for--.

Signed and sealed this 4th day of July 1972.

(SEAL)
Attest:

EDWARD M.FLETCHER,JR.
Attesting Officer

ROBERT GOTTSCHALK
Commissioner of Patents